(12) United States Patent
Paus et al.

(10) Patent No.: US 12,187,060 B2
(45) Date of Patent: Jan. 7, 2025

(54) LASER-WRITABLE MARKING LABEL

(71) Applicant: Phoenix Contact GmbH & Co. KG, Blomberg (DE)

(72) Inventors: Manuela Paus, Muenster (DE); Michael Peter, Lage (DE); Patrick Oster, Lemgo (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 134 days.

(21) Appl. No.: 17/924,728

(22) PCT Filed: May 11, 2021

(86) PCT No.: PCT/EP2021/062491
§ 371 (c)(1),
(2) Date: Nov. 11, 2022

(87) PCT Pub. No.: WO2021/228859
PCT Pub. Date: Nov. 18, 2021

(65) Prior Publication Data
US 2023/0191817 A1 Jun. 22, 2023

(30) Foreign Application Priority Data
May 14, 2020 (LU) .......................... 101796

(51) Int. Cl.
*G09F 3/02* (2006.01)
*B41M 5/26* (2006.01)
*G09F 3/00* (2006.01)
*G09F 3/20* (2006.01)

(52) U.S. Cl.
CPC .......... *B41M 5/267* (2013.01); *G09F 3/0295* (2013.01); *G09F 3/205* (2013.01)

(58) Field of Classification Search
CPC ........ B41M 5/267; G09F 3/0295; G09F 3/205
See application file for complete search history.

(56) References Cited

U.S. PATENT DOCUMENTS

| 2,961,785 A | 11/1960 | Toepfer | |
|---|---|---|---|
| 4,477,950 A | 10/1984 | Cisek et al. | |
| 6,309,724 B1 * | 10/2001 | Kulper | G09F 3/10 283/105 |
| 9,786,407 B1 * | 10/2017 | Bose | H01B 1/24 |
| 2004/0194360 A1 * | 10/2004 | McCabe | G09F 3/205 40/316 |

(Continued)

FOREIGN PATENT DOCUMENTS

| CN | 105504517 A | 4/2016 |
|---|---|---|
| CN | 110317402 A | 10/2019 |

(Continued)

*Primary Examiner* — Gary C Hoge
(74) *Attorney, Agent, or Firm* — LEYDIG, VOIT & MAYER, LTD.

(57) ABSTRACT

A composition for producing a laser-inscribable identification tag for attachment to an assembly to be identified includes: a polymeric plastic; and a filler. The filler comprises graphene particles, barium particles, and/or barium sulfate particles. In an embodiment, the polymeric plastic includes polypropylene, polyethylene, PVC, TPU, TPE, TPV, PP/PA, polyketone, PA, ABS, PET, and/or PMMA.

19 Claims, 2 Drawing Sheets

(56) References Cited

U.S. PATENT DOCUMENTS

| | | | | |
|---|---|---|---|---|
| 2007/0173581 A1* | 7/2007 | Hager | ............... | C08K 3/22 |
| | | | | 524/430 |
| 2011/0086420 A1* | 4/2011 | Fischer | ............. | B01L 3/545 |
| | | | | 525/326.1 |
| 2011/0206916 A1* | 8/2011 | Siebert | ............... | B41M 5/26 |
| | | | | 427/595 |
| 2013/0101792 A1* | 4/2013 | Pranov | ............ | B29C 33/3842 |
| | | | | 264/225 |
| 2015/0159316 A1* | 6/2015 | Mao | ............... | C08J 5/249 |
| | | | | 442/175 |
| 2017/0282431 A1* | 10/2017 | Speith | ............ | G09F 3/0295 |
| 2018/0030289 A1 | 2/2018 | Jarvis et al. | | |
| 2018/0194908 A1* | 7/2018 | Kim | ............... | B29D 7/00 |
| 2018/0195210 A1* | 7/2018 | Sunshine | ......... | D03D 1/0088 |
| 2018/0273730 A1* | 9/2018 | Rueger | ............ | C08J 3/226 |
| 2019/0217601 A1* | 7/2019 | Streichardt | ......... | B41M 1/24 |

FOREIGN PATENT DOCUMENTS

| | | |
|---|---|---|
| DE | 102005027803 A1 | 12/2006 |
| EP | 0101797 A2 | 3/1984 |
| EP | 1989057 A1 | 11/2008 |
| GB | 903599 A | 8/1962 |
| GB | 2543841 A | 5/2017 |

\* cited by examiner

LASER-WRITABLE MARKING LABEL

CROSS-REFERENCE TO PRIOR APPLICATIONS

This application is a U.S. National Phase application under 35 U.S.C. § 371 of International Application No. PCT/EP2021/062491, filed on May 11, 2021, and claims benefit to Luxembourg Patent Application No. LU 101796, filed on May 14, 2020. The International Application was published in German on Nov. 18, 2021 as WO/2021/228859 under PCT Article 21 (2).

FIELD

The invention relates to a composition for producing a laser-inscribable identification tag for attachment to an assembly to be identified, to a laser-inscribable identification tag, and to a method for producing a laser-inscribable identification tag.

BACKGROUND

Such a composition for producing a laser-inscribable identification tag contains a polymeric plastic and a filler.

It should be possible to durably inscribe identification tags produced from a polymeric plastic. Polymeric plastics, such as polypropylene, can, in some circumstances, only be printed on with difficulty, e.g., by means of thermal transfer printing or inkjet printing. The printability can be improved by pre-treatment methods, such as plasma activation and/or primer coating. However, such pre-treatment or coating methods result in only limited long-term stability and therefore allow only reduced storability, e.g., of a few weeks, so that prefabrication of identification tags and delivery for use and inscription by a customer is only possible to a limited extent.

For this reason, an identification tag of the present type should be laser-inscribable. In order to ensure this inscribability, the composition for manufacturing the identification tag has, in addition to a polymeric plastic, an additive, for example, in order to enable applying a marking using a laser inscription system, e.g., using a laser with a wavelength of 1064 nm.

Laser-inscribable identification tags are used, for example, for marking systems or cables, in particular electrical cables. Such laser-inscribable identification tags can be used in different industrial sectors, e.g., in the food industry, in which high demands are placed on the durability, resistance and hygiene of such laser-inscribable identification tags.

Identification tags that are used in the sector of the food industry for marking cables or systems, are usually cleaned by means of comparatively aggressive cleaning agents after being attached, in order to remove contamination by germs, said cleaning agents possibly impairing the state of an identification tag over its service life. In this case, it must be ensured that components of identification tags do not get into processed food, for example due to damage or destruction. The identification tags should thus also be resistant to aggressive cleaning agents so that entry of material into foodstuffs is prevented as far as possible, wherein it should additionally be ensured that the components of identification tags can be recognized in foodstuffs if entry of material nevertheless occurs.

DE 10 2004 027 622 A1 describes a laser beam marking method for marking surfaces of polymer materials. The method should be suitable in particular for inscribing conductor identifiers. The polymer material can have particulate fillers, e.g., organic fillers (carbon) or inorganic fillers (aluminum, iron).

EP 1 108 747 A1 describes a laser-inscribable plastic, for example for the identification and inscription of cables and lines, which plastic has dopants in the form of powdered graphite.

SUMMARY

In an embodiment, the present invention provides a composition for producing a laser-inscribable identification tag for attachment to an assembly to be identified, comprising: a polymeric plastic; and a filler, wherein the filler comprises graphene particles, barium particles, and/or barium sulfate particles.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
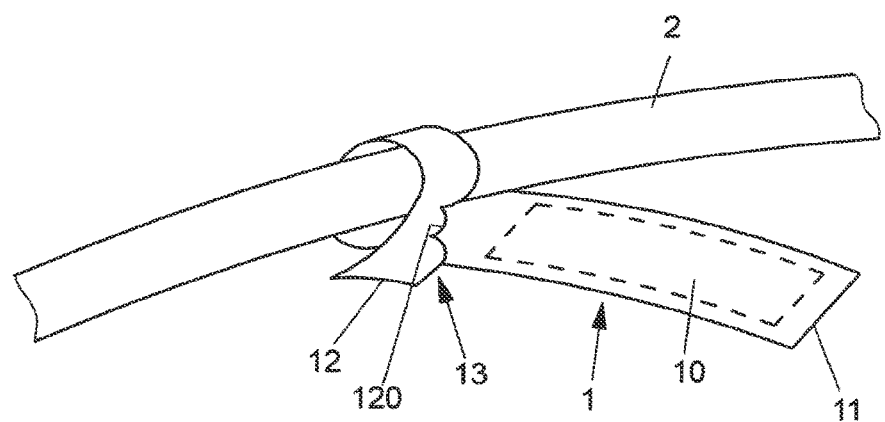
FIG. 1 is a view of an exemplary embodiment of an identification tag in the form of a flexible strip on an assembly to be identified, e.g., a cable.

In an embodiment, the present invention provides a composition for producing a laser-inscribable identification tag, a laser-inscribable identification tag, and a method for producing a laser-inscribable identification tag, which enable good inscribability in an identification tag and also use even in critical environments, e.g., in the food industry, and at the same time detectability in the event of entry of material into, for example, foodstuffs.

Accordingly, the filler in the composition comprises graphene particles, barium particles, and/or barium sulfate particles.

A polymeric plastic which is mixed with a filler is thus used as part of the composition. The filler has graphene particles, barium particles, and/or barium sulfate particles. The use of the filler ensures that an article produced from the composition can be detected, and particles of such an article can thus be detected if they fall into foodstuffs, e.g., in cases where an identification tag produced by means of the composition is used in the food industry. Impurities, e.g., in foodstuffs due to entry of material originating from an identification tag, caused for example by damage to or destruction of the identification tag, for example due to cleaning of the identification tag with an aggressive cleaning agent, can thus be detected so that process safety within the scope of food processing can be improved.

The polymeric plastic of the composition can, for example, be polypropylene, polyethylene, PVC, TPU, TPE (thermoplastic elastomer), TPE-S (i.e., a thermoplastic elastomer with a further elastomer component, e.g., a styrene block copolymer (SBS, SEBS, or SEPS)), TPV, PP/PA, polyketone, PA, ABS, PET, and/or PMMA. The polymeric plastic may have homopolymers (i.e., polymers that are composed of only one monomer unit) and/or copolymers (i.e., polymers that are composed of two or more different types of monomer units). The polymeric plastic may be made of only one substance (e.g., polypropylene) or may be in the form of a blend as a mixture of several different polymers, also referred to as a polyblend.

Graphene, barium, or barium sulfate is an organic material which is added to the polymeric plastic and enables laser inscription. Laser inscription is permanent and durable, even if an identification tag produced from the composition comes into contact with aggressive cleaning agents, oils, or other chemical media.

Graphene is a modification of carbon with a two-dimensional structure in which each carbon atom is surrounded by three further carbon atoms at an angle of 120°, resulting in a honeycomb-shaped pattern. Graphene thus consists of single-layer carbon layers. The use of graphene as the filler can be advantageous, for example in comparison to graphite, for example in order to enable variable coloring (dying) on an identification tag. Graphene is detectable, for example with an X-ray detection method, an inductive detection method, or a magnetic detection method, so that an identification tag produced from the composition or components thereof can be recognized in a simple manner, for example in foodstuffs.

As a further filler, barium or barium sulfate may be used. Barium or barium sulfate can in particular enable improved detectability.

Particles of graphene, barium, or barium sulfate can be used in each case separately or in combination as the filler.

The composition comprising a polymeric plastic and a filler containing graphene particles, barium particles, and/or barium sulfate particles can have a low liquid absorption.

The proportion of filler in the composition may, for example, be between 5 percent by weight and 35 percent by weight (also referred to as mass fraction).

Polymeric plastics, such as polypropylene cannot usually be inscribed easily with a laser inscription system, for example using a laser with a wavelength of 1064 nm (as with a Nd:YAG laser). In an identification tag produced from the composition, inscribability can be made possible, in particular with a laser at a wavelength of 1064 nm, for example by admixing an additive to the composition.

The composition may contain a colorant, for example in the form of a dye (soluble in water or another solvent) or in the form of pigments. By means of such a colorant, the composition can be colored in order to provide a specific color to an identification tag produced using the composition. The composition can in principle be colored with any color using the colorant.

In an embodiment, the invention provides a laser-inscribable identification tag for attachment to an assembly to be identified, which tag is produced from a composition of the type described. The identification tag can have a marking field, for example, to which a suitable inscription, for example in the form of letters, numbers, symbols or other characters, can be applied in order to identify an assembly to which the identification tag will be attached.

The identification tag may, for example, be flexible, for example by forming a flexible bendable film. Alternatively, the identification tag may also be (largely) rigid and substantially non-bendable.

In one embodiment, the identification tag has an engagement opening and an engagement portion which can be guided through the engagement opening. The identification tag can thus be fixed on an assembly to be identified, e.g., a cable, by placing the identification tag around the assembly and guiding the engagement portion through the engagement opening. In the attached position, the engagement portion engages in the engagement opening so that the identification tag is thereby fixed to the assembly to be identified.

The identification tag can be designed, for example, as a strip extending along a longitudinal direction. In this case, the strip can be flexible so that the identification tag can be placed around the assembly to be identified, e.g., a cable, in order to fix the identification tag to the assembly in this way.

The engagement opening can be spaced apart from the engagement portion along the longitudinal direction so that, by placing the identification tag around the assembly to be identified, and by guiding the engagement portion through the engagement opening, a loop can be formed which engages around the assembly to be identified and thus fixes the identification tag to the assembly.

The engagement portion can, for example, have a narrowing which enables a fastening engagement of the engagement portion in the engagement opening. Since the narrowing is located in the engagement opening, the engagement portion can be axially fixed to the engagement opening so that a loop formed by placing the identification tag around the assembly to be identified is substantially fixed in its size.

In one embodiment, the engagement portion can have a plurality of narrowings which are axially arranged in sequence along the longitudinal direction, and thus offset with respect to one another, so that loops of different sizes can be formed by placing the marking strip around the assembly to be identified.

In one embodiment, the narrowing can be formed by at least one portion of the identification tag recessed relative to an outer portion. The narrowing is thus formed by the (strip-shaped) identification tag having a reduced width (measured transversely to the longitudinal direction) in the region of the narrowing.

In one embodiment, the recessed portion can be formed on one side on the identification tag.

In another embodiment, in order to form the narrowing on opposite sides of the identification tag transversely to the longitudinal direction, the engagement portion can have at least one recessed portion each so that the identification tag has, in the region of the engagement portion, recessed portions that project back inward to form the narrowing on sides facing away from one another, and the width of the identification tag is thus reduced at a narrowing.

If a plurality of narrowings is provided, recessed portions are arranged in sequence along the longitudinal direction.

In an embodiment, the invention provides a method for producing a laser-inscribable identification tag for attachment to an assembly to be identified. The method comprises at least the following steps: providing a composition containing a polymeric plastic and a filler, and molding the identification tag from the composition. The filler contains graphene particles, barium particles, and/or barium sulfate particles.

With respect to advantages and advantageous embodiments, reference is also made to the statements above regarding the composition and the identification tag.

In the context of the method, the composition may be provided, for example, as granules. In order to produce the identification tag, the granules are processed further, in particular melted, to form a profile or a film, and optionally are cut or otherwise machined in order to obtain the identification tag.

In one embodiment, the identification tag can be produced, for example, by means of plastic injection molding.

In another embodiment, the identification tag can be obtained by extrusion and a subsequent cutting process. In the course of the cutting process, the identification tag is, for example, cut from a larger structural unit, for example a film or a profiled part, for example using a laser for cutting, or also by a punching process by means of a punching tool.

In one embodiment, when the identification tag is manufactured by means of extrusion, the composition for molding the identification tag can be melted in an extrusion device and molded into a film or a profile in a molding tool. The film or the profile can then be fed to a calender, for example in the form of a roller calender. A roller calender may be designed, for example, for rolling a flat film, and for this purpose can have, for example, at least three rollers.

For example, the identification tag may be manufactured using a film manufactured by means of extrusion and subsequent calendering. Such a film may be manufactured by the manufacturer of the identification tag itself. However, such a film may also be manufactured by an external extruder with supplied granules, and then made available to the manufacturer of the identification tag.

The film may, for example, initially be obtained as a continuous film. In a subsequent step, the film or the profile is cut in a cutting tool in order to obtain film sections (so-called sheets), for example. The cutting may take place, for example, by means of laser cutting or by means of punching using a punching tool. In the course of the same or a further cutting process, one or more identification tags are cut with the desired shape out of the film or the film section. For example, a plurality of identical or different identification tags may be cut from a (single) film section.

In one embodiment, prior to or after the cutting of the identification tags from the film, a deep-drawing process is carried out in order to form an identification tag in a three-dimensional manner. If such a deep-drawing process is used before cutting, the film or the profile can be deep-drawn as a whole. If the deep-drawing process is used after the cutting, the initially flat identification tag obtained after the cutting is fed to a deep-drawing system and thus shaped in a three-dimension manner by deep-drawing.

In one embodiment, the identification tag is inscribed after the molding using a laser inscription device, for example with a laser at a wavelength of 1064 nm. Such an inscription may take place at the manufacturer of the identification tag or, optionally, even by the customer after delivery of the identification tag by the manufacturer to a customer. The identification tag manufactured by the manufacturer using the composition can preferably also be stored over a longer period of time so that between the production of the identification tag at the manufacturer and the inscription, for example at the customer, a longer period of time, for example longer than 6 months, can be possible.

By using a manufacturing process of the described type, identification tags can also be implemented economically in small series or minimum series. This makes it possible to manufacture identification tags based on specific customer specifications, at reasonable process costs and tool costs.

FIG. 1 shows an exemplary embodiment of an identification tag 1 which serves to mark an assembly, e.g., a cable 2, for example an electrical, pneumatic, or hydraulic line.

In the exemplary embodiment shown, the identification tag 1 is designed as a flexible strip which is placed around the cable 2 and has a marking field 10 to which a suitable inscription can be applied.

The inscription may be any type of characters serving for marking. An inscription may in particular comprise letters or numbers, or also symbols or other marking notices.

In the exemplary embodiment shown, the identification tag 1 is fastened to the cable 2 by the identification tag 1 being guided with one end 11 through an engagement opening 120 in the region of an end 12 of the identification tag 1 remote from the end 11. In the fastened state, an engagement portion 13 is positioned in the engagement opening 120 so that the identification tag 1 forms a loop through which the cable 2 extends and by means of which the identification tag 1 is thus held on the cable 2.

The identification tag 1, which is formed as a longitudinally extended, flexible strip in the exemplary embodiment shown, is manufactured from a composition which has a polymeric plastic and additionally a filler containing graphene particles, barium particles, and/or barium sulfate particles. The polymeric plastic of the composition may, for example, be polypropylene, polyethylene, PVC, TPU, TPE (thermoplastic elastomer), TPV, PP/PA, polyketone, PA, ABS, PET and/or PMMA.

The filler enables a detectability of the material of the identification tag 1 so that, in particular if the identification tag 1 is used in the sector of the food industry, it is possible to detect whether material of the identification tag 1 has resulted in contamination during food processing, for example due to entry of material into processed foodstuffs in the event of damage or destruction of the identification tag 1.

The filler may, for example, make up a proportion of 5 percent by weight to 35 percent by weight, for example 20-25 percent by weight, of the composition for producing the identification tag 1.

The composition may be colored with a colorant, for example a dye or pigments. For example, a blue coloration (RAL 5012) is conceivable and possible, although in principle any coloring can be used.

Other substances, in particular additives, for example mineral substances, such as talcum, may also be added to the composition, for example in order to increase the stability of the composition for the manufacture of the identification tag 1.

Figure 2:
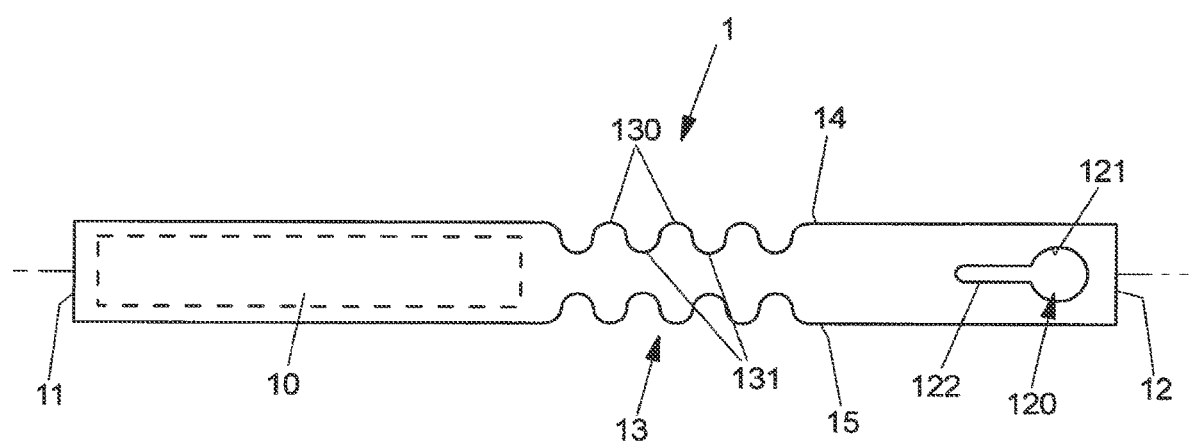
FIG. 2 is a view of an exemplary embodiment of an identification tag.

An exemplary embodiment of an identification tag 1 before the attachment to an assembly to be identified, e.g., a cable 2, is shown in FIG. 2. In the exemplary embodiment shown, the identification tag 1 extends longitudinally along a longitudinal direction L and is designed as a strip with a substantially identical width along its length (apart from an engagement portion 13 formed approximately centrally on the identification tag 1).

In the region of one end 11, a marking field 10 is provided, to which an inscription can be applied using a laser inscription system.

In contrast, in the region of an end 12 facing away from the end 11, an engagement opening 120 is formed, which forms a substantially circular opening portion 121 and a slot opening 122 adjoining the opening portion 121, and which is shaped in such a way that the identification tag 1 can be guided with the end 11 through the engagement opening 120 in order to fix the identification tag 1 to an associated assembly to be identified, e.g., a cable 2.

Between the end 11 and the end 12, an engagement portion 13 is formed which, in the exemplary embodiment shown, has a plurality of narrowings 131 which are arranged in sequence along the longitudinal direction L, and in the region of which the width of the identification tag 1 measured transversely to the longitudinal direction L along a transverse direction Q is reduced relative to the outer width of the strip-shaped identification tag 1.

In the exemplary embodiment shown, the narrowings 131 are formed by recessed portions formed on both sides of the identification tag 1. A recessed portion on one side 14 of the identification tag 1 is associated with an opposite recessed portion on a side 15 of the identification tag 1 facing away from the side 14, so that in the region of each narrowing 131, the width of the identifying step 1 is reduced by indentations on both sides. The recessed portions on each side 14, 15 of the identification tag 1 are separated from one another by outer projecting portions 130 so that a ribbed structure results on each side 14, 15 in the region of the engagement portion 13.

The narrowings 131 arranged in sequence enable the identification tag 1 to be placed around an associated assembly, e.g., a cable 2, such that loops of different sizes can be formed. In a fixed position, the engagement portion 13 engages in the engagement opening 120, wherein a narrowing 131 comes to lie in the region of the substantially circular opening portion 121 of the engagement opening 120, and the loop formed by the identification tag 1 is thus fixed in its size. Since different narrowings 131 can be brought into engagement with the opening portion 121, the size of the loop formed by the identification tag 1 can be adapted and the identification tag 1 can thus be attached to different assemblies, e.g., cables 2 with different cable diameters.

Figure 3:
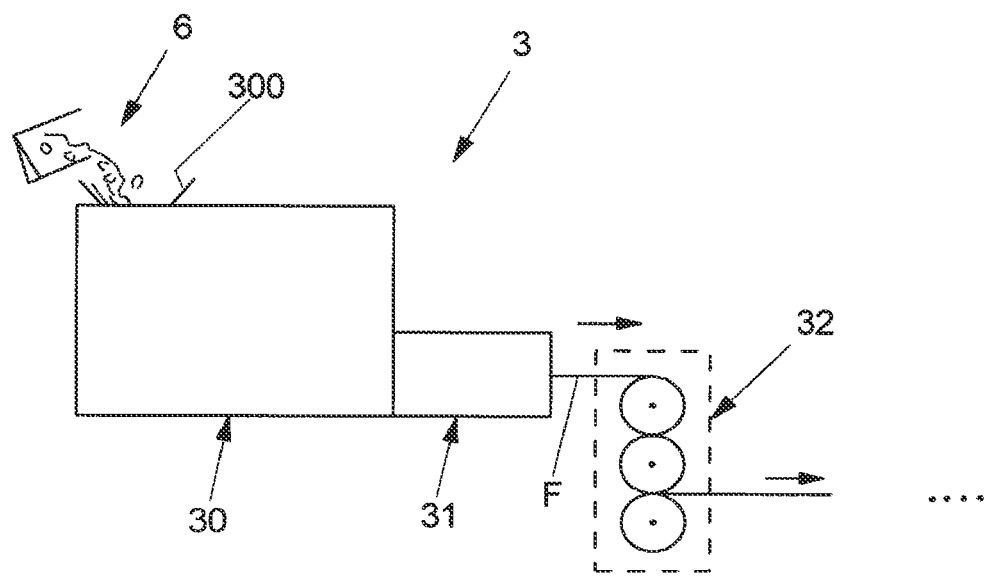
FIG. 3 is a view of a manufacturing process for manufacturing identification tags.
Figure 3:
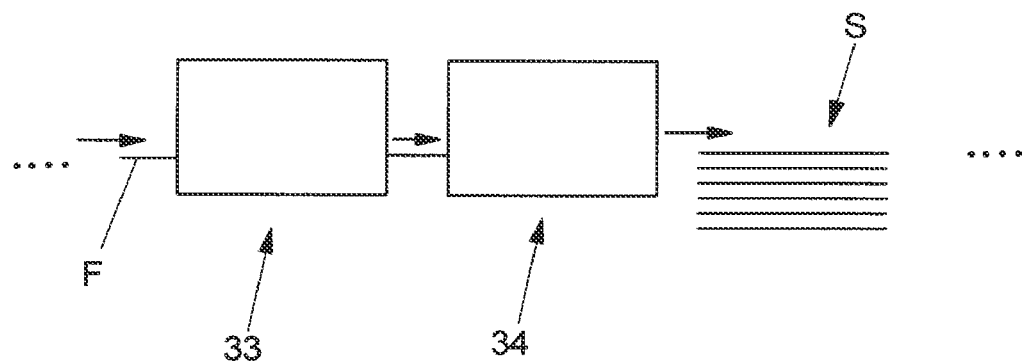
Figure 3:
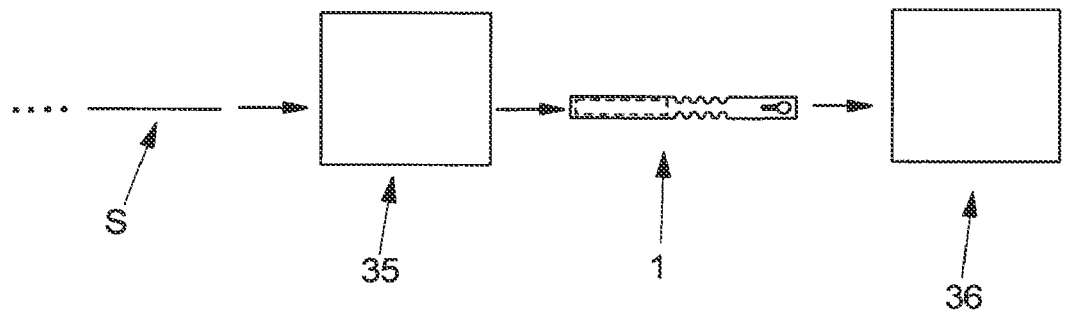

FIG. 3 illustrates a manufacturing process for producing identification tags 1.

In order to manufacture identification tags 1, a composition containing a polymeric plastic and a filler, for example in the form of granules G, can be provided and fed to an extrusion device 30 (extruder) in which the granules G are melted and fed to a molding tool 31 for molding.

The molding tool 31 may, for example, mold the molten material to form a film F which, for example, has a width between 50 mm and 200 mm, e.g., 110 mm. The film F is fed along a feed direction to a calender unit 32, e.g., a 3-roller calender, which rolls the film flat, for example to a thickness between 0.5 mm and 1 mm, e.g., 0.8 mm.

The film F obtained in this way is, for example, wound as a continuous film and optionally temporarily stored, and then fed to cutting tools 33, 34, e.g., so-called CO2 cutters, which cut the continuous film into individual pieces of, for example, a length between 50 mm and 200 mm, e.g., 100 mm, so that individual film sections S (so-called sheets) are obtained.

The film sections S can now be fed, either at the manufacturer of the film sections S or by the customer after delivery, to a further cutting tool 35, which cuts one or more identification tags 1 out of a single film section S. The cutting tool 35 may in turn, for example, be a so-called CO2 cutting laser.

The identification tags 1 thus obtained are then fed to a laser inscription device 36, which inscribes the identification tags 1 and, for this purpose, applies a suitable marking to the marking field 10 of each identification tag 1.

The cutting in the cutting tool 35 can take place in such a way that the identification tags 1 are cut into a film section S, but the identification tags 1 are not yet separated from one another. This has the advantage that a plurality of identification tags 1 can be fed as a coherent film section S to the laser inscription device 36 in order to be inscribed in the laser inscription device 36. After the inscription, the identification tags 1 can then be detached from the film section S, e.g., by cutting, tearing, or bending, in order to attach the identification tags 1 to associated assemblies, e.g., cables 2, for the purpose of marking them.

The idea behind the invention is not limited to the exemplary embodiments described above but can also be implemented in another manner.

Identification tags of the type described can be used for marking entirely different assemblies and are not limited to the attachment to cables in this respect.

By using the described composition, such identification tags can be laser-inscribable in a favorable manner so that a durable inscription is obtained which is insensitive to mechanical or chemical influences.

The material of an identification tag produced from the described composition can have a low liquid absorption and can moreover be detectable for example using an X-ray detection method, an inductive detection method, or a magnetic detection method, so that use of the identification tags in critical sectors, e.g., in the food industry, is possible.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 Identification tag
10 Marking field
11 End
12 End
120 Engagement opening
121 Further opening portion
122 Slot opening
13 Engagement portion
130 Outer portion
131 Narrowing (recessed portion)
14, 15 Sides
2 Assembly (cable)
3 Manufacturing device
30 Extrusion device (extruder)
300 Filler shaft
31 Molding tool 32 Calender unit
33 Cutting tool
34 Cutting tool
35 Cutting tool
36 Laser inscription device
F Film
G Granules
L Longitudinal direction
Q Transverse direction
S Film section

The invention claimed is:

1. A composition for producing a laser-inscribable identification tag for attachment to an assembly to be identified, comprising:
a polymeric plastic; and
a filler,
wherein the filler comprises graphene particles, barium particles, and/or barium sulfate particles, and
wherein a proportion of the filler is between 5 wt. % and 35 wt. %.

2. The composition of claim 1, wherein the polymeric plastic comprises polypropylene, polyethylene, PVC, TPU, TPE, TPV, PP/PA, polyketone, PA, ABS, PET, and/or PMMA.

3. The composition of claim 1, further comprising:
a colorant for coloring the composition.

4. A laser-inscribable identification tag, produced from the composition of claim 1, for attachment to an assembly to be identified.

5. The laser-inscribable identification tag of claim 4, wherein the identification tag is flexible.

6. The laser-inscribable identification tag of claim 4, wherein the identification tag has an engagement opening and an engagement portion which is guidable through the engagement opening.

7. The laser-inscribable identification tag of claim 6, wherein the identification tag comprises a strip extending along a longitudinal direction, and
wherein the engagement opening and the engagement portion are spaced apart from one another along the longitudinal direction.

8. The laser-inscribable identification tag of claim 6, wherein the engagement portion has at least one narrowing.

9. The laser-inscribable identification tag of claim 8, wherein a plurality of narrowings are arranged in sequence along the longitudinal direction.

10. The laser-inscribable identification tag of claim 8, wherein the at least one narrowing comprises at least one portion recessed relative to an outer portion.

11. The laser-inscribable identification tag of claim 10, wherein the engagement portion has at least one recessed portion on each side of the identification tag facing away from one another.

12. A method for producing a laser-inscribable identification tag for attachment to an assembly to be identified, comprising:
providing a composition containing a polymeric plastic and a filler; and
molding the identification tag from the composition,
wherein the filler comprises graphene particles, barium particles, and/or barium sulfate particles, and
wherein a proportion of the filler is between 5 wt. % and 35 wt. %.

13. The method of claim 12, wherein the composition comprises granules.

14. The method of claim 12, wherein the identification tag is molded by plastic injection molding.

15. The method of claim 12, wherein the identification tag is molded by extrusion and a subsequent cutting process.

16. The method of claim 15, wherein the composition for molding the identification tag is melted in an extrusion device and molded into a film or a profile in a molding tool.

17. The method of claim 16, wherein the film or the profile is guided through a calender unit.

18. The method of claim 16, wherein the film or the profile is cut in a cutting tool.

19. The method of claim 12, wherein the identification tag is inscribed by a laser inscription device after the molding.

* * * * *